United States Patent Office 3,481,699
Patented Dec. 2, 1969

3,481,699
PROCESS FOR THE PREPARATION OF
SYNTHETIC FAUJASITE
Daniel Domine, Meudon, and Jean Quobex, Paris, France, assignors to L'Air Liquide, Societe Anonyme pour l'Etude et l'Exploitation des Procedes Georges Claude
No Drawing. Filed Jan. 25, 1967, Ser. No. 611,590
Claims priority, application France, Feb. 14, 1966, 49,494
Int. Cl. C01b 33/26
U.S. Cl. 23—112
4 Claims

ABSTRACT OF THE DISCLOSURE

Process for the manufacture of synthetic faujasite by hydrothermal treatment, in which an aqueous suspension of amorphous alkali silicoaluminate of a composition such that the molar ratio of the silica to aluminium oxide is between 2.3 and 4 and the ratio between alkali oxide and aluminium oxide is higher than 1.2 is heated at a temperature which is between about 100 and 160° C., under autogenic pressure and for at least several hours, in the presence of an excess of alkali such that the initial pH value is at least equal to 13.

---

The present invention relates to the preparation of synthetic crystalline zeolite, which can be used particularly for the drying of gases and the separation of gaseous mixtures by adsorption. It is more particularly applicable to the preparation of crystalline zeolite of the synthetic faujasite type.

It is known that faujasite is a crystalline silicoaluminate of a predetermined structure which, in the classification of the minerals, is indicated among the zeolites. Among the different structures of natural zeolites, that of faujasite is undoubtedly the most open.

The composition of faujasite can be represented as a mixture of oxides of calcium, sodium, aluminium and silicon. Analysis of various samples shows that the molar ratio:

$$\frac{Ca+Na_2O}{Al_2O_3}=1\pm0.1$$

and that of the ratio between silica and alumina $$\frac{SiO_2}{Al_2O_3}=4.5 \text{ to } 5$$

The dehydrated faujasite accepts or adsorbs all the molecules of which the minimum projected transverse section has a smaller maximum dimension than that of heptacosafluorotributylamine $(C_4F_9)_3N$. Faujasite has the most open known siliceous lattice.

This fairly rare zeolite has already been synthesised. In particular, the U.S. Patents 2,882,244 and 3,078,635, in the name of Union Carbide and Carbon Corporation, describe the synthesis of a zeolite known as "Zeolite X," having a composition of $(0.9\pm0.2)$ $Na_2O$, $Al_2O_3$, $2.5\pm SiO_2$, $yH_2O$, in which $y$ can be up to 8. This zeolite has a crystalline lattice similar to that of faujasite, which has a crystalline symmetry of diamond and is capable of adsorbing large molecules, the effective pore dimension being about 13 A. Another zeolite with a structure similar to faujasite is "Zeolite Y"; this has a composition consisting of $0.9\pm0.2Na_2O$, $Al_2O_3$, $wSiO_2$, $xH_2O$, in which $w$ can be between 3.5 and 5 and $x$ can be up to 9.

The zeolites of types X and Y, similar to faujasite, are synthesised in accordance with the previously mentioned U.S. Patents 2,882,244 and 3,078,635 and the French Patent 1,231,239 in the name of Union Carbide and Carbon Corporation, by hydrothermic treatment of gels of suitable composition, obtained by mixing the following initial materials; sodium silicate or colloidal silica, sodium aluminate or hydrated aluminium oxide.

The largest number of the prior known synthesis reactions are frequently achieved by hydrothermic treatment of aqueous gels which contain aluminium oxide, silica and an alkali oxide. These gels, formed from alkali metal silicate and alkali metal aluminate, contain a large quantity of alkali metal salt or alkali in the mother liquor, which cannot be separated from the solid phase in view of the hydrothermic treatment.

There has now been found in accordance with the present invention as industrial synthesis process which is simple and reproducible, which uses inexpensive starting materials and permits synthetic zeolites to be obtained with a structure identical with faujasite. This process is characterized by heating to a temperature which is between approximately 100 and 160° C., under autogenic pressure and for at least several hours, an aqueous suspension of an amorphous alkali metal silicoaluminate having a composition such that the molar ratio between silica and aluminium oxide is between 2.3 and 4, and the ratio between alkali oxide and aluminium oxide is higher than 1.2, in the presence of an alkali excess in a quantity such that the initial pH value is at least equal to 13.

The process according to the invention, consisting in forming in aqueous medium a precipitate which can be separated from the mother liquor, by filtration, drying or centrifuging, and washing, permits the hydrothermric treatment in selected medium to be effected: either with pure water or in a medium of controlled pH value, or containing a predetermined excess of alkali.

This process provides a means of determining the composition of the amorphous solid intended to be transformed into zeolite, and permits the choice of reaction medium, this constituting an advantage with respect to the prior processes which use hydrothermic treatment of aqueous gels.

On the other hand, the process according to the invention permits the yield of crystalline product of the hydrothermic treatment apparatus to be increased. This is important, particularly in the case where the treatment is effected in an autoclave, which is a relatively costly apparatus and from which it is necessary to obtain the best efficiency rate. The aqueous gels are relatively voluminous and contain a not very high proportion of solid product. In the case of the preliminary formation of the amorphous precipitate in accordance with the invention, it is possible to select the quantity of water added to the pulverulent solid in order to obtain the crystallisation in the autoclave. The concentration of the solid-water magma to be treated can thus be very high and the production of the autoclave can be increased.

It has been found that the amorphous alkali metal silicoaluminates preferably having compositions such that the molar ratio between silica and aluminium oxide is between 2.5 and 3.5 and the ratio between alkali metal oxide and aluminium oxide is between 3 and 6, are particularly suitable for the synthesis of a zeolite of the faujasite type in accordance with the process of the invention.

The amorphous alkali silicoaluminate suitable for carrying the invention into effect is obtained by reaction between a solution of an alkali metal silicate and a solution of an aluminium salt.

It is preferred to use a sodium silicate and an aluminium salt of mineral acid, such as aluminium sulphate, chloride or nitrate, or a aluminium oxychloride.

During the reaction, at ambient temperature, between the solutions of alkali silicate and aluminium salt, a precipitate is formed which consists of a chemical silicoalumino-alkali metal compound of amorphous nature, whereas the aluminium salt is transformed quantitatively into alkali metal salt. This precipitate is then filtered and washed.

The molar ratio between the silica and the aluminium oxide in the precipitate depends on the ratio $x$ of the quantities of alkali metal silicate and aluminium salt, as well as the ratio $y$ of the silica to the alkali metal oxide of the alkali metal silicate.

The industrial silicates of sodium have a variable molar ratio $y$, from $y=1$ for the metasilicate up to 3.8 for the silicates with a higher silica content.

In the case of silicates with a high silica content, the reaction is written as:

$$4(3.8SiO_2, Na_2O) + Al_2(SO_4)_3 \rightarrow 3Na_2SO_4 + 15.2SiO_2.Al_2O_3.Na_2O$$

and in the case of metasilicate, $y=1$:

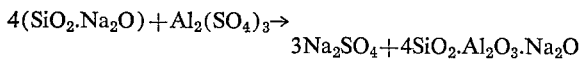

$$3Na_2SO_4 + 4SiO_2.Al_2O_3.Na_2O$$

The use of a silicate having a coefficient $y<1$ is not excluded, possibly as a result of adding a certain quantity of alkali to the initial metasilicate. In this manner, it is possible to obtain an amorphous compound of the ratio $SiO_2/Al_2O_3$ which is smaller than 4.

The use of sodium metasilicate is advantageous in the synthesis of faujasite.

After the hydrothermic treatment under pressure, the synthesis products are controlled. Among the criteria as regards quality and purity, the X-ray diffraction diagram and the adsorption diagram have been retained. The X-ray diagram of powders is effected for each sample and there are applied the usual procedures of calculating the distances of the reticular planes, which make it possible to identify the different crystalline species which are present.

The synthetic zeolites according to the invention show a diagram which conforms to that of natural faujasite.

Examples which illustrate the invention in a non-limiting manner are given below:

EXAMPLE 1

Preparation of amorphous silicoaluminate (A) *Preparation P1.*—A solution of sodium metasilicate with 0.5 mol of $SiO_2$ per litre and a solution of aluminium sulphate with 0.66 mol of $Al_2O_3$ per litre are caused to enter simultaneously a receptacle containing 500 cc. of water, while stirring vigorously. The two solutions are introduced simultaneously with a ratio of rates of flow of 4; that is, an $SiO_2/Al_2O_3$ ratio close to 3, and mixed at normal temperature.

After separation of the precipitate by filtration or hydroextraction and washing, and generally drying, an amorphous silicoaluminate is obtained which has a composition corresponding to the following formula:

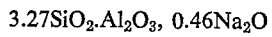

$$3.27SiO_2.Al_2O_3, 0.46Na_2O$$

and containing a certain quantity of water which varies from 20 to 60%, depending on the degree of drying in air.

(B) *Preparation P2.*—A solution of sodium metasilicate with 1 mol of $SiO_2$ per litre and a solution of aluminium sulphate with 0.5 mol of $Al_2O_3$ per litre are simultaneously caused to enter a receptacle of 500 cc. while stirring vigorously. The two solutions are introduced simultaneously with a ratio of rates of flow close to 1, and are mixed at ambient temperature.

After separation of the forming precipitate from the solution, and then washing, an amorphous product is obtained with a composition corresponding to the following formula:

$$2.26SiO_2.1Al_2O_3, 0.38Na_2O$$

and containing a certain quantity of water which varies from 20 to 60%, depending on the degree of drying in air.

(C) *Preparation P3.*—Under the same conditions as above, a solution of sodium metasilicate with 0.5 mol of $SiO_2$ per litre and a solution of aluminium sulphate with 0.5 mol of $Al_2O_3$ per litre are caused to react.

The two solutions are introduced simultaneously with a ratio of rates of flow of 3.

After filtration and washing, an amorphous precipitate is obtained with the composition:

$$3.94SiO_2.1Al_2O_3, 0.73Na_2O$$

containing a certain quantity of water which varies from 20 to 60%, depending on the drying in air.

EXAMPLE 2

The silicoaluminate P1 is treated in the presence of an alkali solution at the temperature of 100° C. under autogenic pressure.

The composition of the reaction mixture, in mols, is as follows:

| | |
|---|---|
| $SiO_2/Al_2O_3$ | 3.27 |
| $Na_2O/SiO_2$ | 1.42 |
| $Na_2O/Al_2O_3$ | 4.65 |
| $H_2O/Na_2O$ | 47 |

Tests carried out with a variable duration of thermal treatment show that, after 4 hours, about 70% of crystalline faujasite is obtained, in the presence of amorphous product or other crystalline species, while 90% of crystalline synthetic faujasite is obtained after 8 hours of autogenic treatment. If the operation is extended to 63 hours or even 112 hours, it is found that the faujasite which is formed is then substantially pure. It adsorbs 11 cc. of nitrogen (NTP) per gram of anhydrous product, under a pressure of 1013 millibars and at a temperature of 20° C., and at low temperature, it adsorbs a considerable quantity of oxygen: at −183° C., the quantity adsorbed is 217 cc. of oxygen (NTP) under 266 millibars.

The powder X-ray diagram of the synthesised zeolite is given in the following table.

This powder diagram was obtained by using the radiation of copper Kα. Column I indicates the interplanar distances $d(A.)$ for a natural faujasite, as well as the relative intensities $I/Io$, by reference to the most intense ray.

Column II gives the characteristics of the substantially pure faujasite prepared according to the invention.

TABLE

| I | | II | |
|---|---|---|---|
| (A) natural faujasite | | Faujasite synthesized according to the invention | |
| $d(A.)$ | 100 $I/Io$ | $d(A.)$ | 100 $I/Io$ |
| 14.3 | 100 | 14.3 | 100 |
| 8.70 | 80 | 8.71 | 30 |
| 7.38 | 80 | 7.40 | 20 |
| 5.66 | 100 | 5.65 | 40 |
| 4.76 | 80 | 4.74 | ---------- |
| 4.36 | 80 | 4.36 | 30 |
| 3.76 | 100 | 3.76 | 62 |
| 3.29 | 80 | 3.30 | 45 |
| 2.93 | 80 | 2.91 | 40 |
| 2.81 | 80 | 2.86 | 42 |
| 2.75 | 60 | 2.76 | 18 |
| 2.61 | 60 | 2.63 | 15 |
| 2.37 | 70 | 2.37 | ---------- |
| 2.17 | 60 | 2.18 | ---------- |

Reading of this table clearly shows the good conformity which exists between the succession of the rays of the products obtained according to the invention and of the natural products referred to for reference purposes, and confirms the identification of the synthesised compounds of column II.

EXAMPLE 3

The tests carried out in this example are intended to show the influence of the alkali concentration on the crystallization of the faujasite.

The amorphous silicoaluminate P1 is treated in the presence of an alkali solution with a concentration smaller than that of Example 1, at 100° C., under autogenic pressure.

The total molar ratio $Na_2O/Al_2O_3$ of the reaction mixture is 1.18. The resulting product, after 63 hours, and even after 112 hours of thermal treatment, is amorphous.

It is found that the ratio $Na_2O/Al_2O_3$ of the reaction mixture must be higher than 1.2 in order to obtain a transformation into faujasite.

EXAMPLE 4

This example constitutes a study of the limits of composition of the amorphous silicoaluminate suitable for the synthesis of faujasite.

The amorphous silicoaluminate P2 is treated in the presence of an alkali solution, at 100° C., under autogenic pressure.

The ratio of $SiO_2/Al_2O_3$ is 2.26 and the ratio of $Na_2O/Al_2O_3$ is equal to 3.5. The product obtained after 6 hours of thermal treatment is amorphous, while the silicoaluminate P1 of ratio $SiO_2/Al_2O_3=3.27$, treated under the same conditions leads to a product containing an appreciable quantity of faujasite.

The amorphous silicoaluminate P3 of ratio $$SiO_2/Al_2O_3=3.94$$

treated in the presence of alkali solution at 100° C., under autogenic pressure, in a quantity such that $$Na_2O/Al_2O_3=5.27$$

leads after 6 hours to a product containing only about 10% of crystalline faujasite.

This example shows that the favourable range for obtaining a crystalline synthetic faujasite is such that the ratio $SiO_2/Al_2O_3$ must be higher than 2.26 and smaller than 4.

EXAMPLE 5

The silicoaluminate P1 is treated in the presence of an alkali solution at a temperature of 150°C. under autogenic pressure.

The composition of the reaction mixture is similar to that of Example 2.

Tests carried out with periods of thermal treatment of 5 hours, 6¼ hours and 8 hours show that it is principally crystalline synthetic faujasite which is obtained in the presence of small quantities of foreign silicates, which are shown by the X-ray diagram.

These different examples clearly show the range of composition which is favorable for obtaining the synthetic faujasite according to the invention.

The molar ratio of $SiO_2/Al_2O_3$ is between 2.3 and 4, preferably 2.5 to 3.5, while the molar ratio of $Na_2O/Al_2O_3$ is higher than 1.2 and is preferably between 3 and 6. The quantity of water can vary in such a way that the molar ratio of $H_2O/Na_2O$ is between 10 and 300.

What we claim is:

1. Process for the manufacture of crystalline zeolite of the synthetic faujasite type by hydrothermal treatment, comprising heating an aqueous suspension consisting essentially of amorphous solid silicoaluminate at a temperature which is between about 100 and 160° C., under autogenic pressure and for at least several hours, in the presence of excess sodium hydroxide in a quantity such that the initial pH value is at least equal to 13, the reaction mixture having a composition such that the silica to aluminum oxide ratio is between 2.3 and 4 and the sodium oxide to aluminum oxide ratio is higher than 1.2, said amorphous solid sodium silico-aluminate being obtained by the reaction between a solution of sodium silicate and a solution of an aluminum salt of mineral acid thereby forming a precipitate of said amorphous silicoaluminate.

2. Process according to claim 1, characterized in that the aluminum salt is used in a form of aluminum sulphate, aluminum chloride, aluminum nitrate or aluminum oxychloride.

3. Process according to claim 1, characterized in that the reaction of the solutions of sodium silicate and aluminium salt of mineral acid is effected at ambient temperature while stirring well.

4. A process in accordance with claim 2 wherein said sodium silicate is sodium metasilicate.

References Cited

UNITED STATES PATENTS

| | | | |
|---|---|---|---|
| 1,515,007 | 11/1924 | Behrman | 23—113 |
| 1,895,121 | 1/1933 | Behrman | 23—113 |
| 2,882,244 | 4/1959 | Milton | 23—113 |
| 3,334,964 | 8/1967 | Reid | 23—113 |

OTHER REFERENCES

Barrer: "J. Chem. Soc.," 1948, p. 2158–2163.
Barrer et al.: "J. Chem. Soc.," 1959, pp. 195–208.

EDWARD J. MEROS, Primary Examiner